Jan. 17, 1967   J. L. PLAIN   3,298,713
EXTENSION ADAPTER AND METHOD FOR LENGTHENING
THE WHEEL BASE OF A MOTORCYCLE
Filed Nov. 6, 1964   2 Sheets-Sheet 1
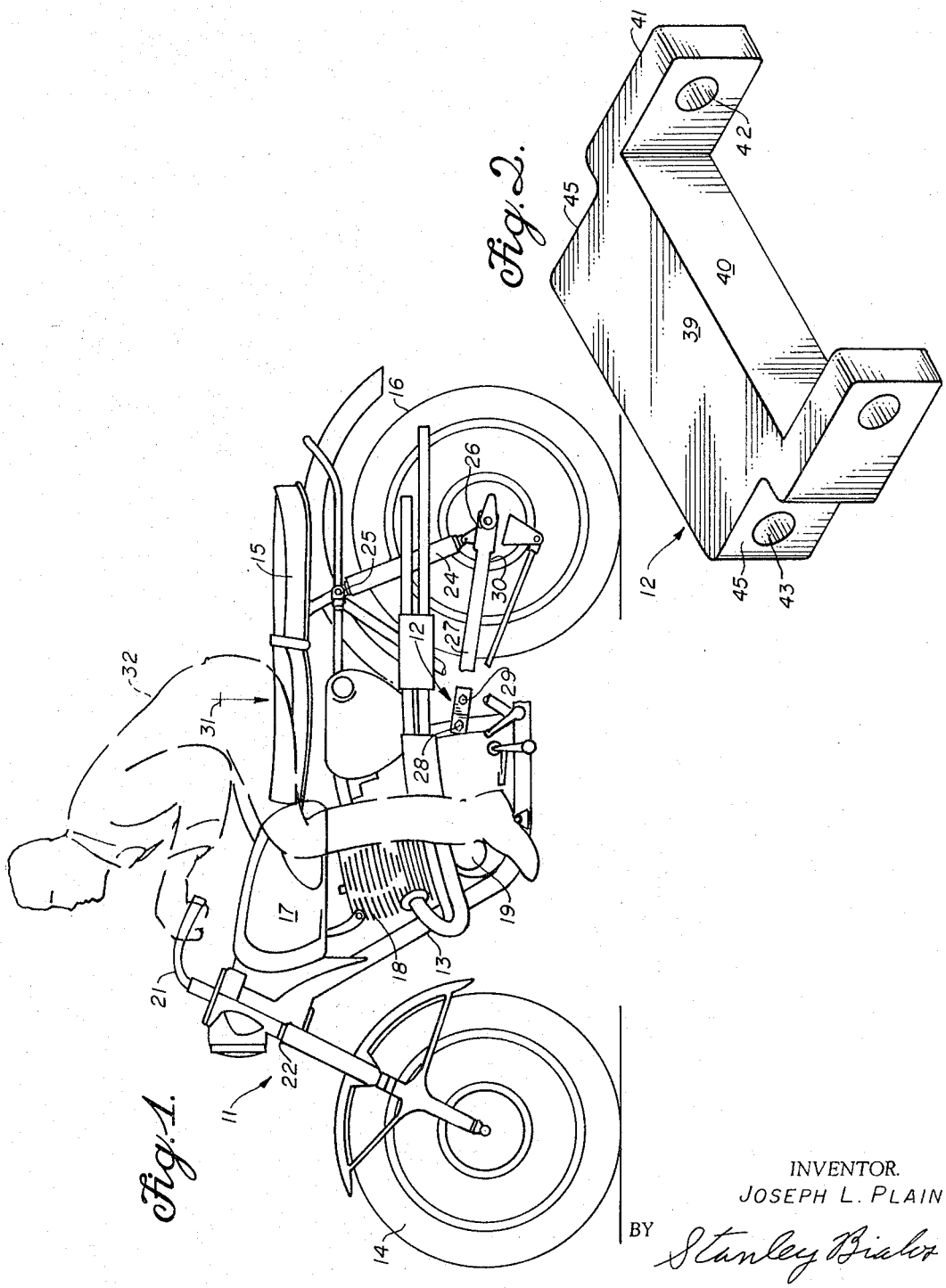
INVENTOR.
JOSEPH L. PLAIN
BY Stanley Bialer
ATTORNEY

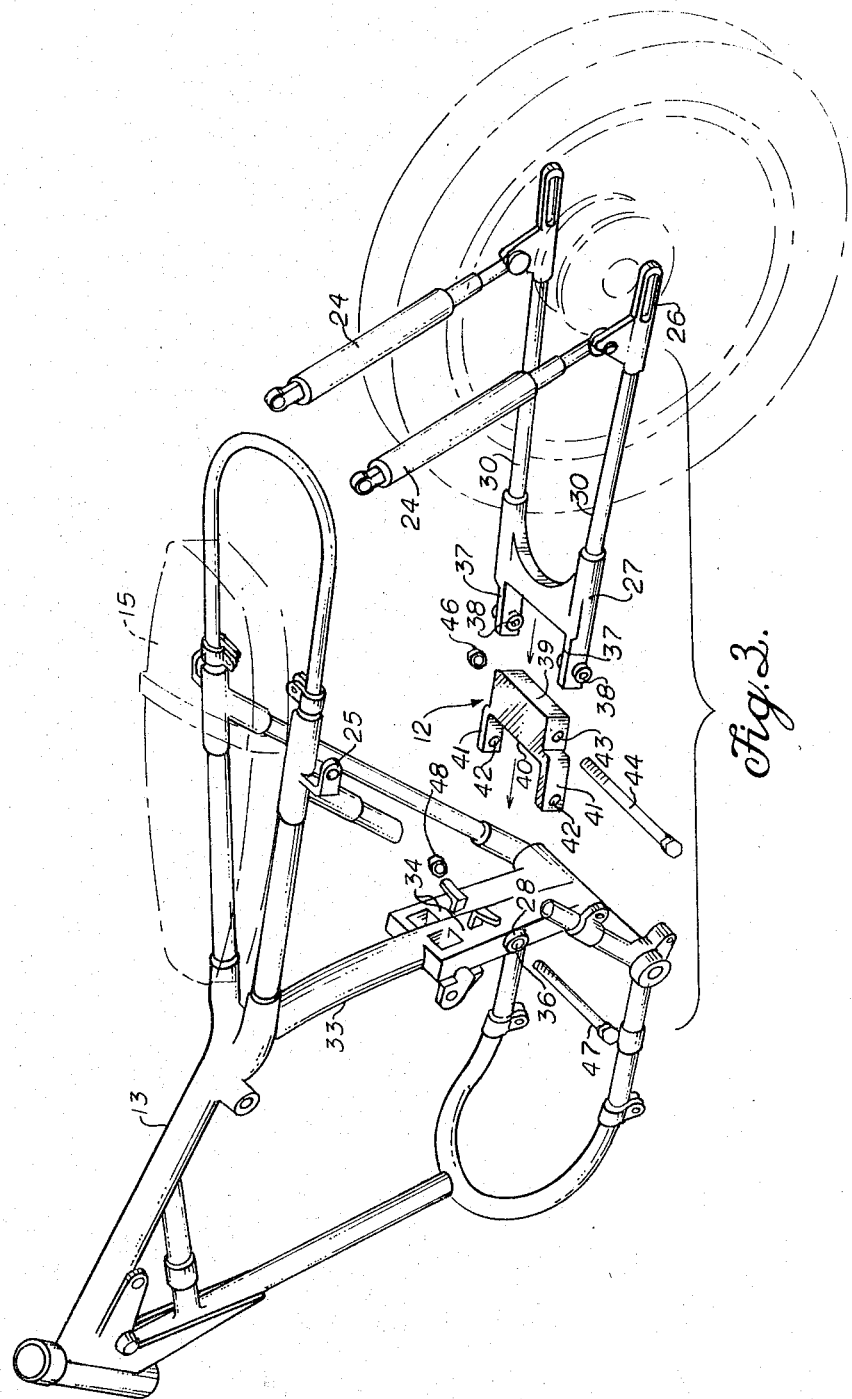

# United States Patent Office 3,298,713
Patented Jan. 17, 1967

---

3,298,713
EXTENSION ADAPTER AND METHOD FOR LENGTHENING THE WHEEL BASE OF A MOTORCYCLE
Joseph L. Plain, 511 Bernal St., Livermore, Calif. 94550
Filed Nov. 6, 1964, Ser. No. 409,511
8 Claims. (Cl. 280—284)

The present invention relates to motorcycles, and more particularly, to extending the length of the wheel base of a motorcycle to improve its rideability.

Motorcycles are becoming increasingly popular as a means of transportation and for sport racing. On most motorcycles, the rear wheel is mounted to the motorcycle frame by a suspension system which includes a forked arm extending rearward from the frame and pivotally mounted to such frame at its front end. The rear wheel fits between the prongs of the forked arm which are connected by their ends to the wheel axle. Shock absorbers, one on each side of the wheel, are also connected at one of their ends to the wheel axle, and at their opposite ends to the motorcycle frame.

Some motorcycles are so constructed that the center of weight of an operator in a normal seating position on the motorcycle is necessarily directly over the rear wheel suspension system. Because of such positioning of the operator's center of weight, pivoting motion of the forked arm is transmitted to the operator. That is, whenever the rear wheel moves in a generally vertical direction in response to a discontinuity in the motorcycle's path or change in speed of the motorcycle, at least part of this motion is transmitted to the operator. This detrimentally affects the safety and comfort of the operator as well as his control of the motorcycle.

If the ground is at all rough, such motion can continually keep a major portion of the operator's weight off the motorcycle. Besides being an unsafe condition, this reduces the traction of the wheels.

Such positioning of the operator's weight is also detrimental during cornering. A motorcycle is turned by the operator leaning in the direction of the turn, as well as by his turning the front wheel. In the turn, the operator usually accelerates the motorcycle which causes the rear shock absorbers to compress, i.e., the forked arm pivots upward toward the operator. The shock absorbers decompress as the operator is correcting the lean by straightening up to a vertical position when the motorcycle comes out of the turn. Because of the positioning of the operator over the pivot arm, this decompression of the shock absorbers accentuates his movement to correct the lean, thereby causing an overcorrection, i.e., the operator is thrown to the other side. Such overcorrections have caused many injurious accidents in races as well as in street driving.

The present invention overcomes the above difficulties by taking the center of the operator's weight off the rear wheel suspension system. Summarizing the same, it comprises a wheel base extender having means at one end for rigid connection to the motorcycle frame at the place at which the forked arm is adapted to be pivotally connected, and means at the opposite end for pivotal connection to the forked arm. The extender is of sufficient length to shift the forked arm rearward of the center of weight of a normally seated operator. Desirably, it is of a length to place the pivot axis of the arm directly below the center of the operator's weight. Then, neither pivot motion of the frame nor of the arm is transmitted to him.

From the preceding, it is seen that the invention has as its objects, among others, the provision of simple and economical improved adapter means and method for enhancing rideability, safety, comfort, control, performance, and stability of a motorcycle. Other objects and advantages of the invention will become apparent from the following more detailed description considered in conjunction with the attached drawings which illustrate a particular make of motorcycle, namely, a Honda Scrambler, in which the invention hereof has found particular utility. In such drawings:

FIGURE 1 is a generally schematic, partly broken away view of a motorcycle with an operator in phantom normally positioned thereon, and having an extension adapter of the present invention incorporated therein;

FIGURE 2 is an isometric view of an advantageous extension adapter embodiment of the invention; and FIGURE 3 is an isometric, exploded and partly phantom view of the frame and rear wheel suspension system of the motorcycle of FIGURE 1, and illustrated the relationship of the adapter of FIGURE 2 thereto.

The motorcycle 11 is shown in FIGURE 1 with a wheel base extender 12 of the present invention incorporated therein. Motorcycle 11 includes a frame 13 from which a front wheel 14 and a rear wheel 16 is suspended. Frame 13 conventionally supports a seat 15, gas tank 17, engine 18 and transmission 19 as well as the usual accessories thereto.

Motorcycle 11 also includes handle bars 21 which coact through front wheel suspending fork 22 with forward wheel 14 for steering. Brake, fuel and clutch controls are conventionally provided on such handle bars 21.

Means for suspending rear wheel 16 includes generally vertically extending shock absorbers 24, one on each side of the wheel and only one of which is shown in FIGURE 1. Each shock absorber 24 is pivotally mounted by one end to the frame at 25, and at the other end to an axle plate 26 at the wheel axle. A forked arm 27 is also mounted by the end of its prongs 30 to axle plate 26 for pivotal movement about the wheel axis. Without the wheel base extender of the present invention, such forked arm 27 would also be mounted by its front end to frame 13 at 28 for pivotal movement about an axis parallel to the rear wheel axle of the motorcycle, and the difficulties discussed previously would be present.

In keeping with the invention, however, a linking structure or wheel base extender 12 is rigidly mounted by its front end to the frame 13 at 28 and acts as a longitudinal rearward extension of the frame. While for illustrative purposes, forked arm 27 is shown broken away, it should be understood that it is pivotally connected to the opposite end of linking structure 12 for pivotal movement about an axis 29 parallel to the wheel axle. Thus, it is seen that arm 27 is thereby shifted longitudinally from frame 13 a distance generally equal to the length of the linking structure 12. In this manner, the wheel base of motorcycle 11 is lengthened. As mentioned before, the length of member 12 should be sufficient to place arm 27 rearward of the center of weight 31 of an operator 32 (shown in phantom) normally positioned on seat 15. Desirably, the pivot axis 29 of the arm 27 is directly below such center of weight 31. In such position, pivot motion of arm 27 as well as of frame 13 about axis 29 does not appreciably affect the operator.

That is, when rear wheel 16 moves vertically either in response to a discontinuity in the motorcycle's path, or acceleration or deceleration of such motorcycle, the motion is not directly transmitted to the operator and does not appreciably adversely affect his control of and firm seating on the motorcycle. If the frame should pivot in a vertical plane with respect to wheel 16, such motion will also not appreciably affect the operator.

Besides overcoming the aforementioned difficulties, use of the linking structure of the invention has certain advantages. In effect, it lengthens the wheel base of the motorcycle. Because of such, the motorcycle is stabler in the longitudinal direction which improves its hill climbing and sliding ability. In addition, it provides for better weight distribution to the wheels.

For a more detailed description of extender 12 and the manner in which it is incorporated into the motorcycle frame, reference is now made to FIGURES 2 and 3. As shown in FIGURE 3, frame 13 includes at its rear portion a generally vertically extending support arm 33 having means for pivotally connecting arm 27. That is, arm 33 has side members 34 with bolt receiving holes 36 aligned with a similar bolt receiving hole (not shown) through support arm 33. These bolt holes are aligned on an axis parallel to the rear wheel axle. Forked arm 27 has two longitudinally extending flanges 37 at its front end supporting bolt receiving collars 38. Bolt collars 38 are spaced apart a distance generally equal to the transverse distance across support arm 33 and side members 34 so that such collars can be fitted about the support arm and side members in alignment with bolt holes 36. In conventional motorcycles not having the wheel base extender of the present invention, a bolt is inserted through the collars and bolt holes to pivotally mount arm 27.

From both FIGURES 2 and 3, it is seen that wheel base extender 12 comprises a block structure 39 having longitudinally extending flanges 41 on its front end with axially aligned bolt holes 42 therethrough. These flanges 41, similarly to collars 38, are spaced apart a distance generally equal to the transverse distance across support arm 33 and side members 34. In addition, bolt holes 42 are spaced a distance from an abutment face 40 of block 39 such that when they are aligned with holes 36, such face 40 engages flush against support arm 33 and side members 34. Therefore, a bolt, such as bolt 47, through bolt holes 42 and 36 mounts extender 12 to frame 13 rigidly as a longitudinal rearward extension thereof.

Wheel base extender 12 is adapted to its rear portion to be pivotally mounted to forked arm 27. Block 39 has recesses 45 at its end portion distal from flanges 41, and a width therebetween to fit between collars 38. In addition, it has a transversely extending bolt receiving hole 43 through such end portion adapted to be aligned with collars 38. The axis of bolt hole 43 is parallel to the axis of side member holes 36, and bolt hole 43 is sufficiently close to the end of block 39 that such block will not interfere with pivot motion of arm 27 when such bolt hole 43 is aligned with collars 38. A bolt 44 and nut 46 therefor are provided to pivotally mount forked arm 27 by collars 38 and hole 43 to the extender 12. Bolt 44 and nut 46 can be the original bolt used to mount arm 27 to frame 13. Thus, it can be seen that it is only necessary to provide one additional bolt 47 and nut 48 (to rigidly connect the extender to the frame) in order to incorporate the wheel base extender of the invention into a motorcycle.

Due to the stresses naturally placed on the extender during riding of the motorcycle, it should be made of a structurally strong material such as a metal or alloy thereof. In addition, it is desirable to keep the motorcycle as light as practical and, hence, extender 12 should be lightweight. Aluminum and aluminum alloys are particularly suitable as materials for the extender.

The Honda Scrambler, which is one of several motorcycles for which the extender has been found to be particularly effective and useful, has an overall wheel base length from axle to axle of approximately 52½ inches, with the pivot axis of the rear arm being 36 inches from the front wheel axle. Incorporation therein of a wheel base extender which has a length between the axes of holes 42 and hole 43 of 2¼ inches provides close to optimum positioning of the center of weight of an operator normally positioned on such motorcycle. Thus, the wheel base length with the extender is about 54¾ inches while the pivot axis of forked arm 27 is 38¼ inches from the front axle.

The extender of the present invention is also effective on motorcycles having more than two wheels. For example, if another rear wheel is provided to make a tricycle, or support a side car, the extender is still effective in providing the operator with added safety, comfort and control.

I claim:

1. A wheel base extender for a motorcycle which has a frame, a front wheel, a rear wheel, and means for suspending the rear wheel from said frame including a forked arm having pivot connection means at its front end for attachment to said frame; said extender comprising a linking structure insertable between said frame and said forked arm for lengthening the wheel base of said motorcycle and having means at one end thereof for rigid connection to said motorcycle frame to provide a longitudinal rearward extension thereof, and means at the opposite end of said structure for pivotal connection to the front end of said arm.

2. A wheel base extender for a motorcycle which has a frame, a front wheel, a rear wheel, and means for suspending the rear wheel from said frame including a forked arm having pivot connection means at its front end for attachment to said frame; said extender comprising a linking structure insertable between said frame and said forked arm for lengthening the wheel base of said motorcycle and having means at one end thereof for rigid connection to said motorcycle frame to provide a longitudinal rearward extension thereof, and means at the opposite end of said structure for pivotal connection to the front end of said arm, said structure having a length between said connection means to place said arm rearward of the center of weight of an operator normally positioned on said motorcycle.

3. The wheel base extender of claim 2 wherein said member has a length between said connection means to place the pivot axis of said arm directly below the center of weight of an operator normally positioned on said motorcycle.

4. A wheel base extender for a motorcycle which has a frame, a front wheel, a rear wheel, and means for suspending the rear wheel from said frame including a forked arm having pivot connection means at its front end for attachment to connection means on the rear portion of said frame; said extender comprising linking structure having means at one end thereof for rigid connection to the connection means on said frame to provide a longitudinal rearward extension of said frame, and means at the opposite end of said structure for pivotal connection to the front end of said arm for movement about an axis generally parallel to the axle of said rear wheel, said structure having a length between the connection means thereof to place said arm rearward of the center of weight of an operator normally positioned on said motorcycle.

5. A wheel base extender for a motorcycle which has a frame, a front wheel, a rear wheel, and means for suspending the rear wheel from said frame including a forked arm having at its front end longitudinally extending flanges which support bolt receiving collars for pivotal connection of said arm to said frame; a linking structure having longitudinally extending flanges on its front end, an abutment face between such flanges, a rearwardly projecting end portion, aligned bolt receiving holes in the flanges adjacent the front end thereof for connection to said motorcycle frame and spaced such distance from the abutment face as to provide engagement of said face against said motorcycle frame for rigidly connecting the linking structure to said frame, the rearwardly projecting portion having recesses on the sides thereof and a width therebetween to fit between the collars on said arm and a bolt receiving hole therethrough to pivotally connect said arm to said structure, the distance between the holes in said flanges and the hole through the rearwardly projecting portion being such as to place the arm rearward of the center of weight of an operator normally positioned on said motorcycle.

6. A motorcycle comprising a frame, a front wheel, a rear wheel, a first means for suspending the front wheel from said frame, a second means for suspending the rear wheel from said frame including a forked arm having pivot connection means at its front end for attachment to said frame, a linking structure inserted between said frame and said forked arm for lengthening the wheel base of said motorcycle and rigidly connected by one end thereof to said frame as a longitudinal rearward extension thereof and pivotally connected at an opposite end thereof to said front end of said arm, said linking structure having a length between said ends to place said arm rearward of the center of weight of an operator normally positioned on said motorcycle.

7. A motorcycle comprising a frame, a front wheel, a rear wheel, first means for suspending the front wheel from said frame, second means for suspending the rear wheel from said frame including a forked arm, mounting means on said frame for pivotally connecting said arm to said frame, a linking structure rigidly connected adjacent one end thereof to said mounting means as a longitudinal rearward extension of said frame and pivotally connected at an opposite end thereof to said arm, said linking structure having a length between said ends to place said arm rearward of the center of weight of an operator normally positioned on said motorcycle.

8. A method of improving the rideability of a motorcycle having a rear wheel shock absorbing system including a forked arm pivotally connected at its front end to a rear portion of the frame of said motorcycle comprising providing an extender linking structure for insertion between said forked arm and said frame, and lengthening the wheel base of the motorcycle by disconnecting the forked arm from the frame, rigidly connecting said extender by one end thereof to the rear portion of said frame, and pivotally connecting said arm to the opposite end of said linking structure to shift the pivot axis of said arm rearward of the center of weight of an operator normally positioned on said motorcycle.

References Cited by the Examiner

UNITED STATES PATENTS

| 657,667 | 9/1900 | Mills | 280—284 |
| 1,407,218 | 2/1922 | Previtali | 280—284 |
| 1,488,537 | 4/1924 | Furze | 280—284 |
| 2,187,238 | 1/1960 | Judd | 280—283 |

FOREIGN PATENTS

| 1,091,580 | 10/1954 | France. |
| 270,394 | 5/1927 | Great Britain. |
| 709,282 | 5/1934 | Great Britain. |

KENNETH H. BETTS, *Primary Examiner.*